US008719103B2

(12) United States Patent
Bouaziz et al.

(10) Patent No.: US 8,719,103 B2
(45) Date of Patent: May 6, 2014

(54) SYSTEM, METHOD, AND APPARATUS TO FACILITATE COMMERCE AND SALES

(75) Inventors: Patrick Bouaziz, New York, NY (US); Laurent Michel-Etienne, Brunoy (FR)

(73) Assignee: iLoveVelvet, Inc., New York, NY (US)

( * ) Notice: Subject to any disclaimer, the term of this patent is extended or adjusted under 35 U.S.C. 154(b) by 227 days.

(21) Appl. No.: 13/019,401

(22) Filed: Feb. 2, 2011

(65) Prior Publication Data
US 2012/0016758 A1 Jan. 19, 2012

Related U.S. Application Data

(60) Provisional application No. 61/364,242, filed on Jul. 14, 2010.

(51) Int. Cl.
*G06Q 20/00* (2012.01)
*G07B 17/00* (2006.01)
*G07F 19/00* (2006.01)

(52) U.S. Cl.
USPC ............................................. 705/17; 705/30

(58) Field of Classification Search
USPC ................................................ 705/16, 30, 17
See application file for complete search history.

(56) References Cited

U.S. PATENT DOCUMENTS

| 7,591,430 B2 | 9/2009 | Talach et al. | |
| 7,844,255 B2 * | 11/2010 | Petrov et al. | 455/411 |
| 2006/0136344 A1 * | 6/2006 | Jones et al. | 705/402 |
| 2008/0257954 A1 | 10/2008 | Naccache et al. | |
| 2009/0207021 A1 | 8/2009 | Naccache | |
| 2009/0237214 A1 | 9/2009 | Talach et al. | |
| 2010/0185535 A1 | 7/2010 | Naccache | |
| 2010/0198725 A1 | 8/2010 | Naccache | |
| 2010/0299265 A1 * | 11/2010 | Walters et al. | 705/67 |

FOREIGN PATENT DOCUMENTS

| JP | 2001-222766 A | 8/2001 |
| JP | 2005-216225 A | 8/2005 |
| JP | 2005-242727 A | 9/2005 |
| JP | 2009-075745 A | 4/2009 |

OTHER PUBLICATIONS

International Search Report and Written Opinion dated Sep. 21, 2011 from corresponding International Patent Application No. PCT/US2011/023741—8 pages.

* cited by examiner

*Primary Examiner* — Seye Iwarere
(74) *Attorney, Agent, or Firm* — Maier & Maier, PLLC

(57) ABSTRACT

A system and method for conducting commerce and sales operations is disclosed. A sales representative identifies a customer, chooses a product, and completes a sales transaction using a front-end POS software application. The sales data is transferred to a central storage server, where a master database is created with the data from the front-end POS software application. The central storage server transmits and receives data from back-end corporate servers and databases and creates a master database containing data from corporate applications. The front-end POS software devices uses a holster that includes a docking station, sliding cradle for a mobile device, a card reader, and an infrared scanner to identify products and complete payment.

5 Claims, 14 Drawing Sheets

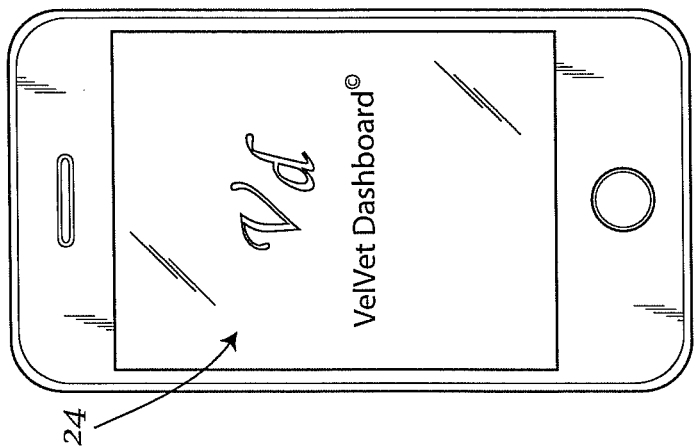
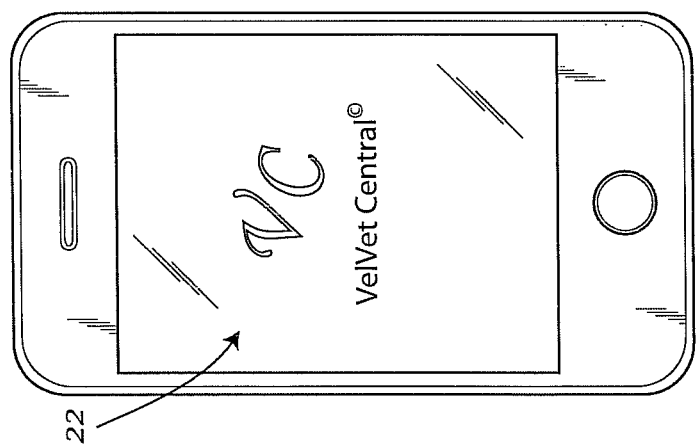
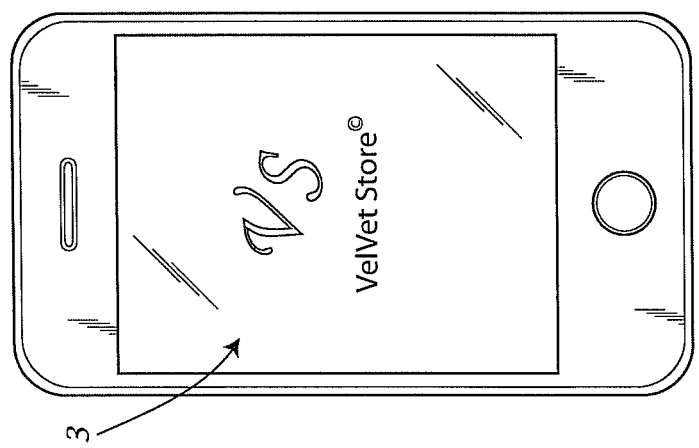
Fig. 1

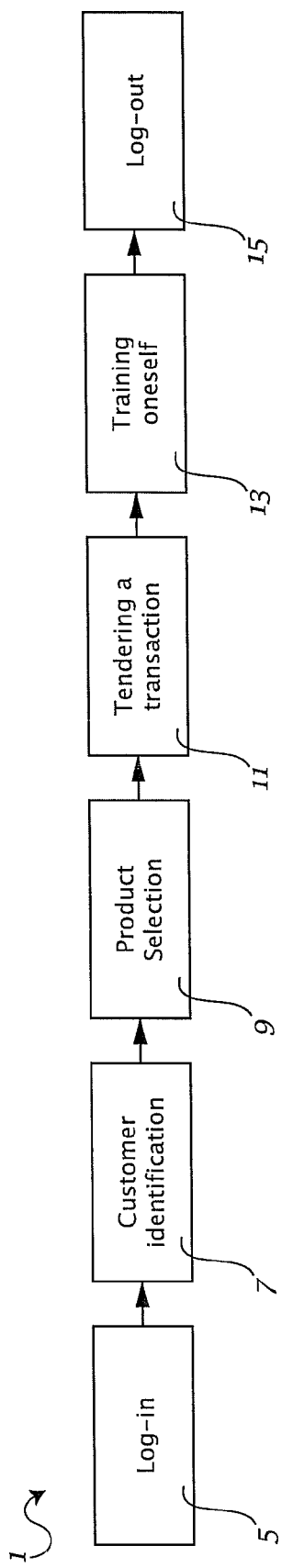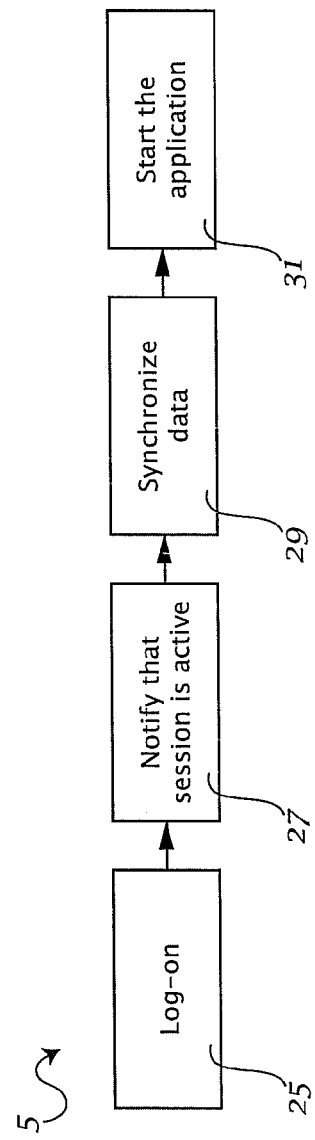
*Fig. 3*
*Fig. 4*

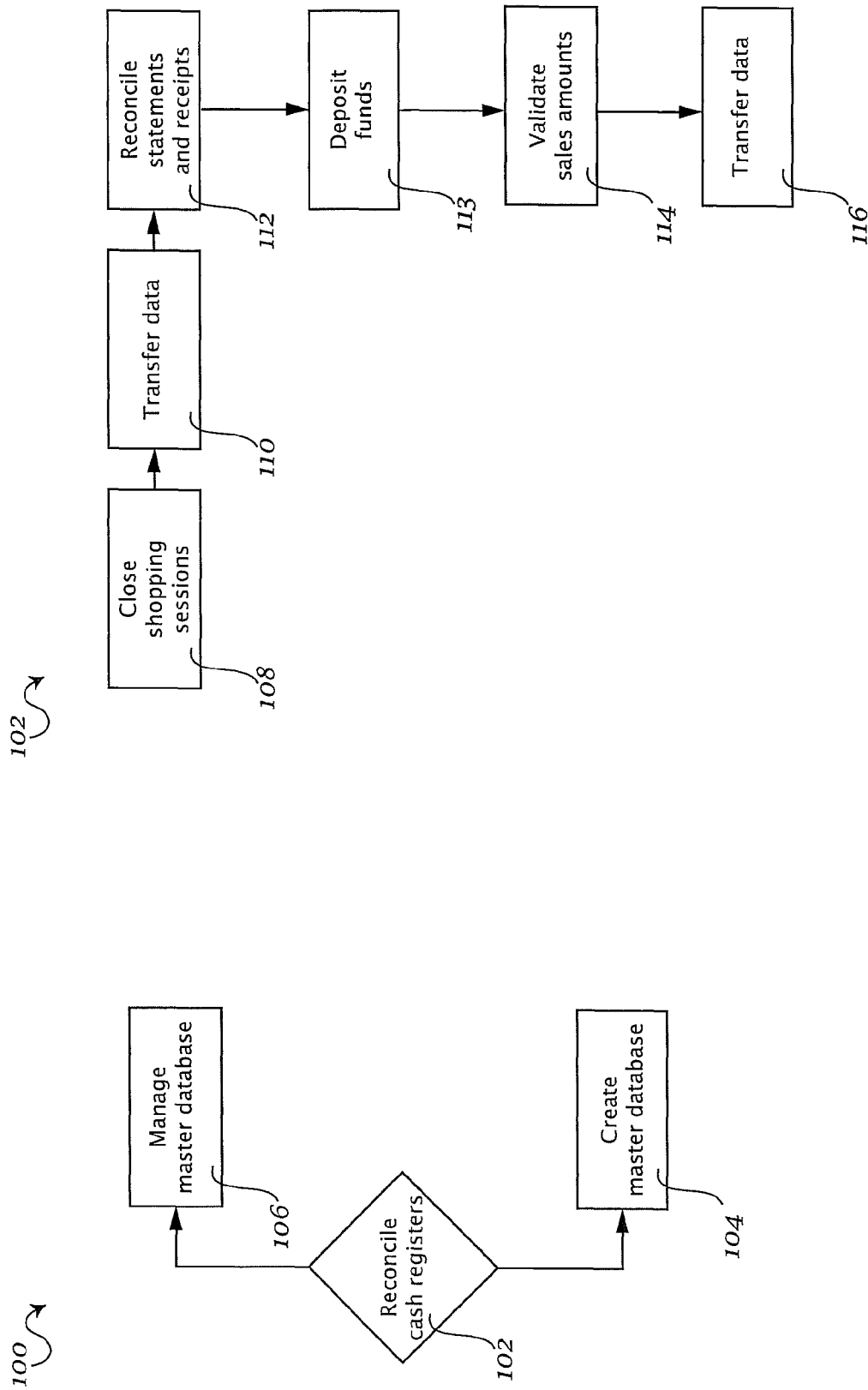

SYSTEM, METHOD, AND APPARATUS TO FACILITATE COMMERCE AND SALES

RELATED APPLICATIONS

This application claims the benefit of U.S. Provisional Patent Application No. 61/364,242, filed on Jul. 14, 2010, and entitled, "System, Method and Apparatus to Facilitate Commerce and Sales", which is incorporated herein by reference.

BACKGROUND

In modern retail environments, the customer is presented with too much in-store delay while waiting for payment or trying to find the location of a product. Further problems include long lines during busy periods, inadequate staff at the selling area, and lack of excitement in the shopping experience. A disappointing shopping experience often results, which can further lead to lost sales.

Employees also encounter problems such as figuring out ways to please and create loyalty among customers to increase repeat business, feeling lost due to increasingly complex and rapidly changing products, and needing fast integration that respects budget constraints and allows for troubleshooting of existing applications.

Due to hypercompetitive environments, the retailer can no longer compete on price alone and become frustrated with the lack of business drivers that can speed up business processes. The retailer must find new ways to keep consumers and inspire high levels of customer loyalty. To sustain and improve profitability, retailers must focus on delivering a differentiated in-store experience. This experience must motivate customers not only to return, but to share their experiences and make recommendations to family, friends, and co-workers.

SUMMARY

Embodiments disclosed herein can provide methods and systems for conducting commerce and sales operations. The embodiments disclosed herein can improve customer interactions at every stage of a transaction, ensure that employees have the skills to understand customer needs and have relevant knowledge about store products, and can create a differentiated in-store experience with fun and interactive tools.

The embodiments disclosed herein can put more technology into the hands of employees to improve productivity and create a better work experience. The embodiments can further implement user-centric applications providing sales support and e-learning functions. The embodiments can also result in better utilization of enterprise resources and investment in solutions that are future-proof and cost-effective.

The embodiments disclosed herein can further build brand value and differentiation by providing superior shopping services and implementing business intelligence (BI) solutions with pre-configured key performance indicators (KPIs) and a dashboard.

The embodiments disclosed herein include a system for conducting commerce and sales operations includes a mobile device coupled to a mobile holster, implementing a front-end point-of-sale software application; a central server, coupled to the mobile device via a store local area network (LAN), that implements both a central software application and an in-memory business analytic software application.

In another exemplary embodiment, a system for conducting commerce and sales operations can include a mobile device coupled to a mobile holster, implementing a front-end point-of-sale software application; a local store server, coupled to the mobile device via a store LAN and coupled to a payment processor via a network, that implements a central software application and an in-memory analytic application; a central server, coupled to the local store server via a store LAN, that implements both a central software application and in-memory business analytic software application.

In another exemplary embodiment, a system for conducting commerce and sales operations can include a first location using a mobile device, coupled to a mobile holster, implementing a front-end point-of-sale software application, a second location using a mobile device, coupled to a mobile holster, implementing a front-end point-of-sale software application, and a local store server, coupled to the mobile device via a store LAN and coupled to the payment processor via a network, that implements a central software application and an in-memory analytic application, wherein the first location and the second location couple to a central server that implements both a central software application and an in-memory analytic software application.

In another exemplary embodiment, a system for conducting commerce and sales operations includes a mobile device, coupled to a mobile holster, implementing a front-end point-of-sale software application; a local store server, coupled to the mobile device via a store LAN and coupled to a payment processor via a network, that implements a central software application and an in-memory analytic application; a central server, coupled to the local store server via a store LAN, that implements both a central software application and in-memory analytic software application; an Oracle computer terminal coupled to an Oracle retail server implementing a database software application, an Oracle corporate retail server, coupled to the Oracle retail server and the central server, and a corporate application server coupled to the Oracle corporate retail server.

The embodiments disclosed herein can include a method for conducting commerce and sales operations including initiating a front-end software application, logging in to a session, identifying a customer, selecting a product for the customer, tendering and completing a transaction, logging out of the session, initiating synchronization between the front-end software application and a central software application, completing a reconciliation between sales revenue and sales records, creating and inputting master data to a central storage server, and managing the master data within the central storage server.

Other features of the disclosed embodiments will be apparent from the accompanying drawings and from the detailed description which follows.

DETAILED DESCRIPTION OF THE DRAWINGS

The present embodiments are illustrated by way of example and not limitation in the figures of the accompanying drawings, in which like references indicate similar elements and in which:

FIG. 1 shows the front-end POS software application, the central software application, and the back-end software application of the present invention.

FIG. 3 shows the overall process of performing a customer purchase transaction using the front-end POS software application according to the present invention.

FIG. 4 shows the detailed functions of the log-in step of FIG. 3.

FIG. 10 shows the overall process of performing the inputting and managing of data using the central software application according to the present invention.

FIG. 11 shows the detailed functions of the cash register reconciliation step of FIG. 10.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

FIG. 1 shows the three main components of an exemplary embodiment: a front-end point-of-sale (POS) software application 3, a central software application 22, and an in-memory analytic software application 24. The front-end software POS software application 3 can run on various mobile devices such as, for example, the iPhone, iPod Touch, and the iPad, or any other mobile device known in the art that enables the embodiments to function as described herein. The mobile devices can include a relational database management application such as, for example, SQLite. The central software application 22 can run as a web application on a central server that is developed using a software development framework such as, for example, .NET, or as a standalone version on a mobile device. Central software application 22 can be technologically based on a relational database management application such as, for example, SQL, Oracle, or any other relational database management software that enables application 22 to function as described herein. The in-memory analytic software application 24 can be used in conjunction with central software application 22 to centralize KPIs and statistical information.

Figure 2:
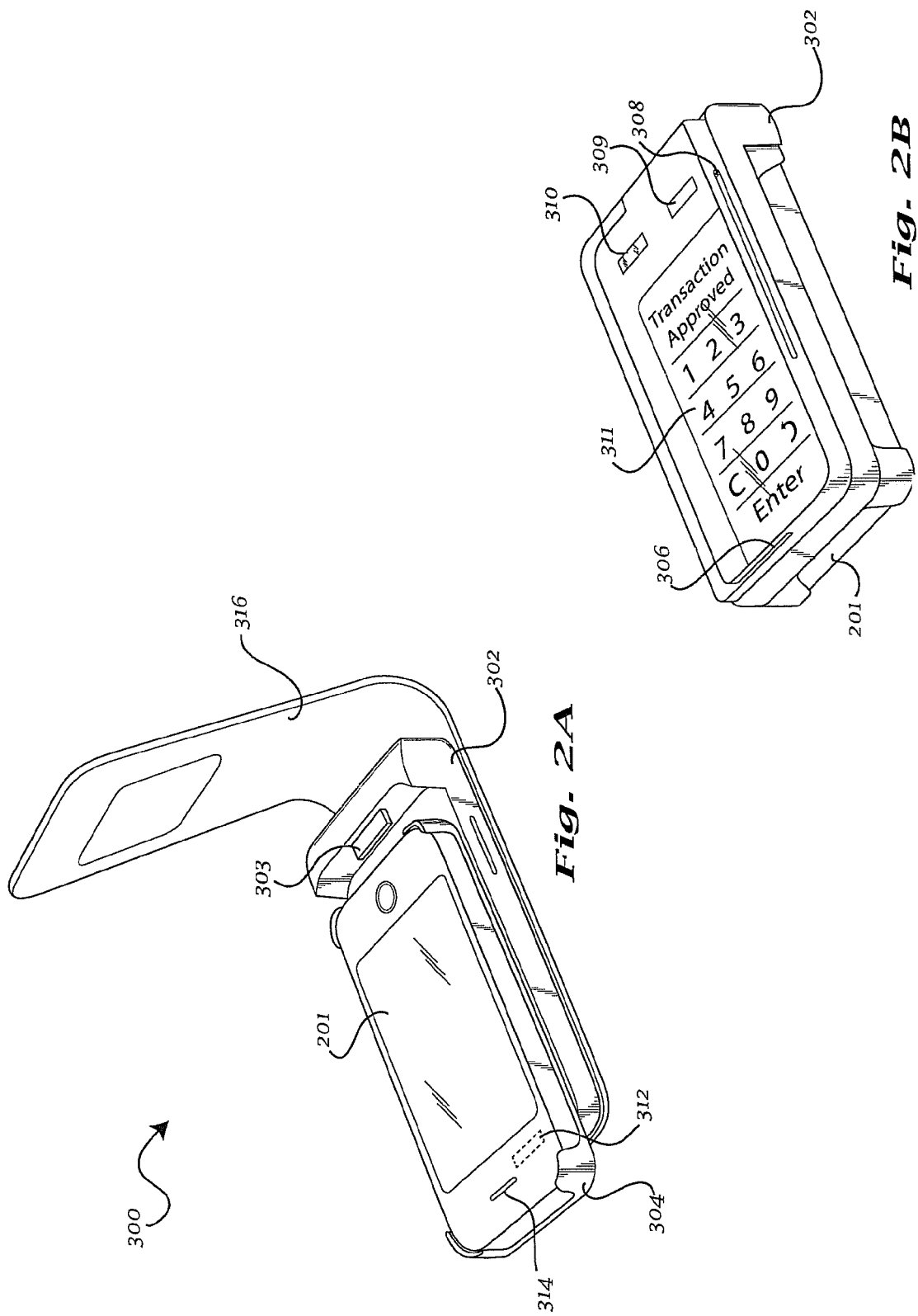
FIG. 2A shows a holster device for holding a mobile device that is implementing the front-end software application of the present invention.
FIG. 2B shows a perspective view of the holster device of FIG. 2A.

FIGS. 2A-2B show a holster 300 for holding mobile device 201 on which front-end software application 3 can be implemented. Holster 300 can be adapted to hold various types and sizes of mobile devices 201. Mobile device 201 may include a speaker 314 which may be utilized by front-end software application 3 to provide the user with auditory feedback. Holster 300 can include a docking station 302 that communicatively couples to the mobile device 201 and allows the front end software application 3 to be implemented on mobile device 201. Holster 300 can include a sliding cradle 304 which is adapted for securely holding mobile device 201. Cradle 304 may be slid between a loading position, where mobile device 201 can be removed from or inserted into cradle 304, and an operating position, where mobile device 201 is communicatively coupled to docking station 302. The communicative coupling may be facilitated by connector 303, which may be any type of known connector and may correspond to a communications port on mobile device 201.

Holster 300 can further include a card swiper 306 that can be used to swipe magnetic cards, such as credit cards, debit cards, or identification cards. Additionally, holster 300 can include a smart card reader 308 that can access loyalty cards and other payment card options, an RFID antenna and contactless reader 309 for interfacing with RFID-equipped devices, products, or identification cards, and an infrared bar code reader 310. Holster 300 may further include a keypad 311. Keypad 311 may be displayed on a touch-sensitive display or may be a tactile keypad, a touch screen with tactile feedback, or any other keypad known in the art that enables holster 300 to function as described herein. Holster 300 can further include a wireless communication device 312, and a cover 316. Cover 316 may be coupled to the underside of docking station 302 and can fold over to cover the top side of docking station 302 so as to protect the screen of mobile device 201.

FIG. 3 shows the overall process 1 of performing a customer purchase transaction using the front-end POS software application 3 according to the present embodiments. At step 5, a sales representative can log into POS software application 3 so as to open a session. Subsequently, at step 7, the sales representative can utilize POS software application 3 to identify a customer as an existing customer or as a new customer. At step 9, a product can be selected through a cooperative effort between the customer and the sales representative. At step 11, a transaction to purchase the product can be tendered between the customer and the sales representative. At step 13, the sales representative can complete training related to the use of the present inventive process, the use of the present inventive hardware, and directed training dedicated towards the workings of the business or store that the sales representative works for. At step 15, the session can be closed by a sales representative.

FIG. 4 shows the detailed functions of step 5. At step 25, the sales representative can log on to the front-end POS software application 3 by swiping an identification card issued by the business, by approaching a contactless card issued by the business, or by entering a unique and personalized ID and password. The employee identification card may be swiped through card swiper 306 of holster 300, whereupon data stored in the identification card may be communicated via holster 300 to mobile device 201 and POS software application 3 that is miming on mobile device 201. Alternatively, the employee may log in by any other identification method or apparatus known in the art, and may utilize RFID antenna 309, keypad 311, or infrared bar code reader 310 of holster 300 for the purposes of logging in. Subsequently, at step 27, a notification that the session is active can be sent to the central software application 22. At step 29, any master data that has been stored using the central software application 22 since the last session can be downloaded onto the front-end POS software application 3, thereby synchronizing data between central software application 22 and front-end POS software application 3. At step 31, once the application is started, the sales representative can be ready to navigate through the front-end POS software application 3 and perform any kind of operations made available.

Figure 5:
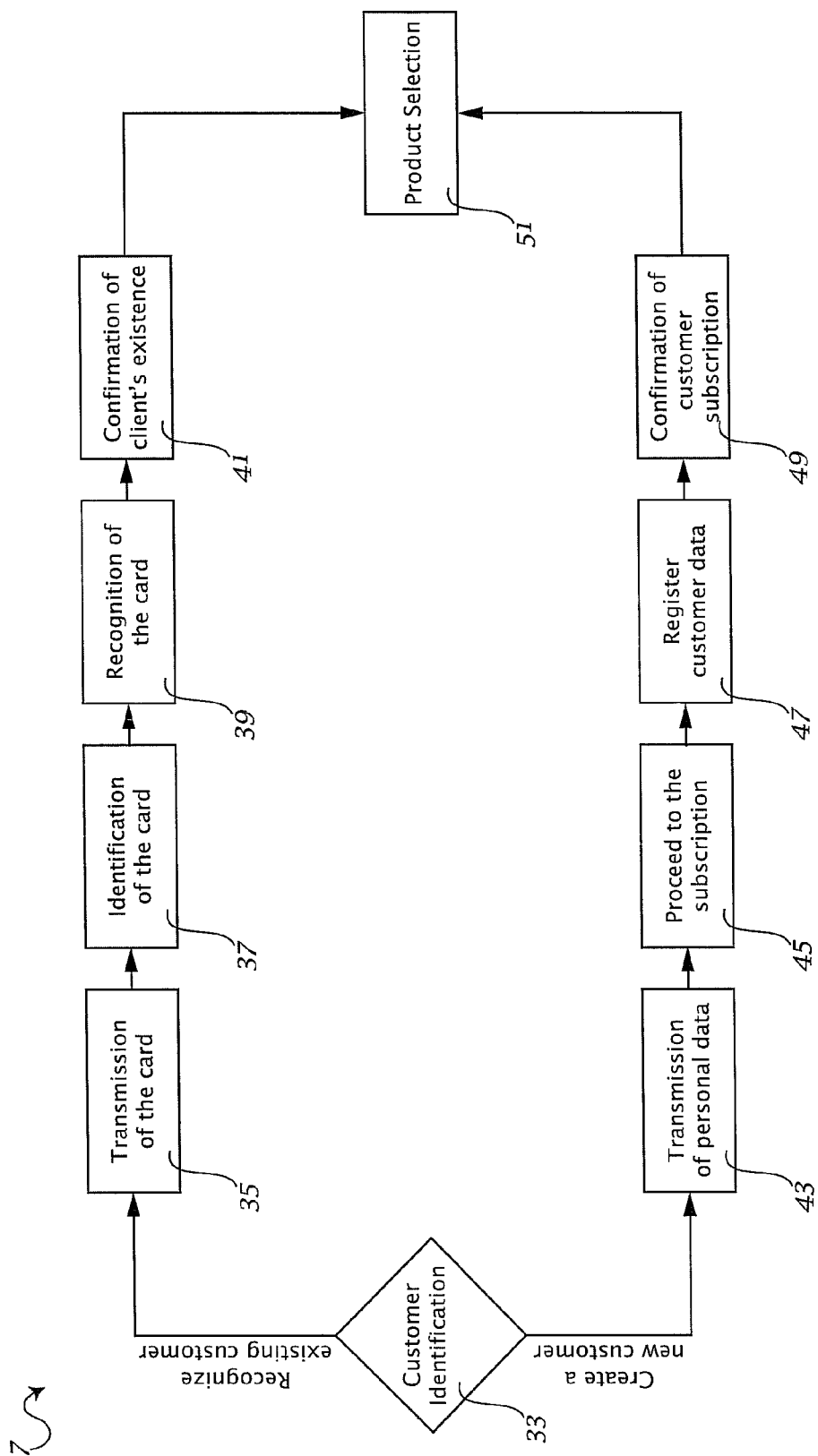
FIG. 5 shows the detailed functions of the customer identification step of FIG. 3.

FIG. 5 shows the detailed functions of step 7. At step 33, the sales representative may utilize a distinction can be made between new customers and previous customers. If a customer is an existing customer, the customer can give a membership or loyalty card or personal information to the sales representative at step 35. At step 37, the sales representative may scan a customer's membership or loyalty card via infrared bar code reader 311 of holster 300, may scan a contactless card via RFID antenna 309 of holster 300, may swipe the customer's card through card swiper 306 of holster 300, or may enter the customer's card number or personal information manually via keypad 311 of holster 300 or via the interface of POS software application 3. Once the customer identification is input into POS software application 3, at step 39, a customer request can be sent to the central software application 22 to confirm the existence of the customer in the records. At step 41, the central software application 22 may synchronize with the front-end POS software application 3 and may confirm or deny the existence of the customer based on the identifying information. If the customer's identity is confirmed, key information and customer usage data may be sent from the central software application 22 to the front-end POS software application 3, which can display the customer's personal data appears to the sales representative. Such personal data can include, as a non-limiting example, a list of the top ten most common products the customer purchases, the total amount spent by the customer in all his visits to the store, the customer's contact details, the customer's status, the profiling information, the number of points the customer has accumulated, or any other desired customer-related information.

Alternatively, if the customer's identity is not recognized by the central software application 22, or if the customer is a new customer, then the sales representative can create a customer profile before completing a transaction. If the customer is a new customer, the sales representative may gather personal information for initiating a customer profile at step 43. Such personal information may include the customer's name, email, zip code, date of birth, marital status, number of children, profiling criteria, or any other desired personal information. At step 45, the sales representative may enter such personal information into the front-end POS software application 3. At step 47, the customer data can be sent to the central software application 22 and a profile may be created and registered for that customer in the central software application 22. At step 49, the central software application 22 may send a confirmation back to the front-end POS software application 3 that the customer's profile and information have been registered. The sales representative can then commence with assisting the customer in selecting a product.

Figure 6:
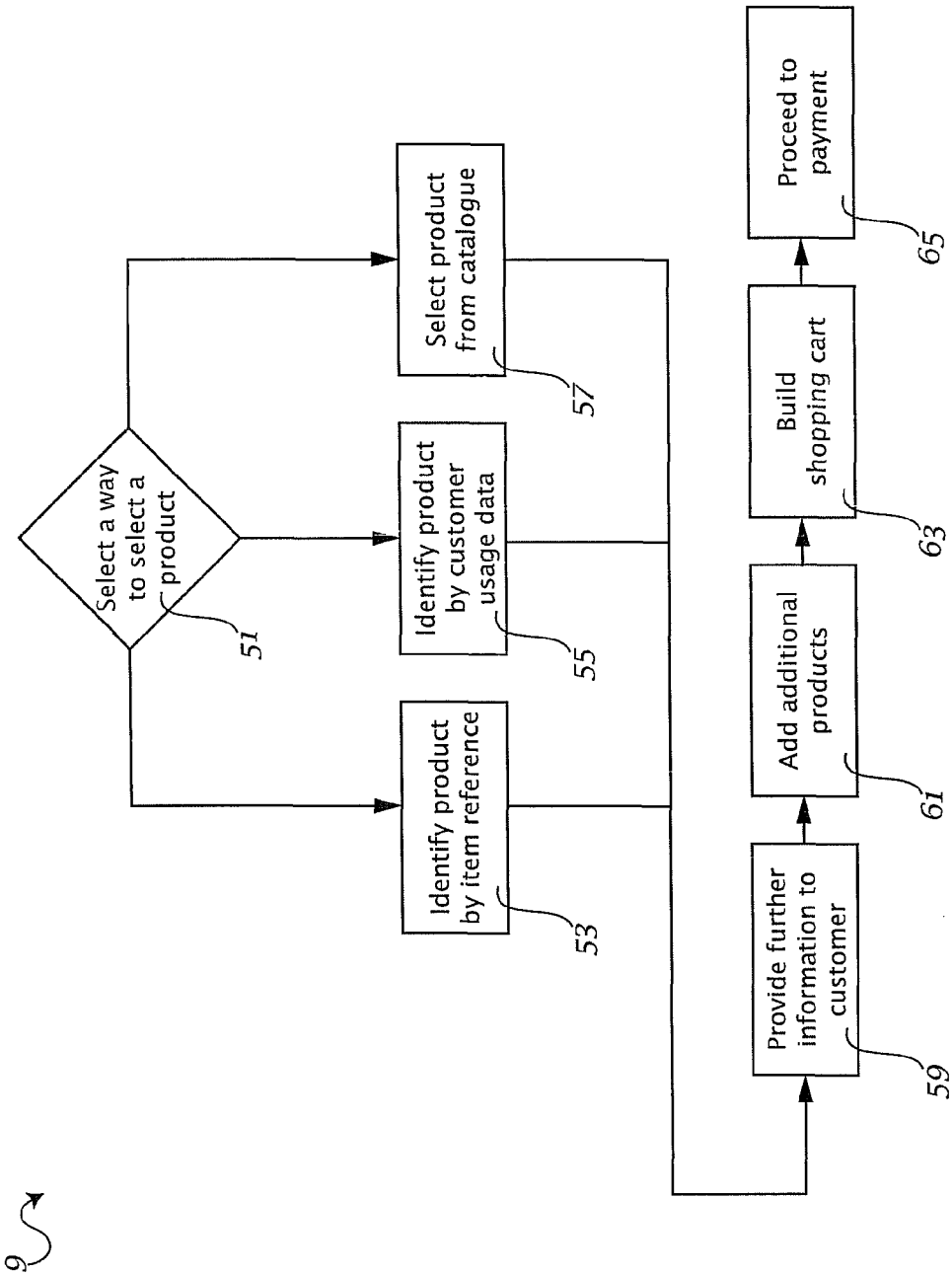
FIG. 6 shows the detailed functions of the product selection step of FIG. 3.

FIG. 6 shows the detailed functions of step 9. At step 51, the sales representative can select one of three ways to select a product. For the first option 53, the sales representative may identify a product by an item reference. To this end, the sales representative can scan an item via infrared bar code reader 311, read an RFID tag via RFID antenna 309, or can search for a product by keyword or item reference number via keypad 311 of holster 300 or via the interface of POS software application 3. For the second option 55, the sales representative can use the customer usage data sent from the central storage application 22 (e.g. Top Ten purchased products, total revenue, or any other desired customer usage data) to select a product commonly purchased by the customer. For the third option 57, the sales representative can search the catalogue of products by category to find a specific product for the customer. Once a product is selected via one of these options, the selected product can be added to a shopping cart.

At step 59, the sales representative may provide further information to the customer, for example answers to any questions or concerns that the customer might have about a particular product, or any other desired information. Such information may be accessed via front-end POS software application 3. The sales representative can also provide the customer with complete and detailed information about product details using product informational videos, which may also be accessed via front-end POS software application 3. At step 61, the sales representative may add additional products to the shopping cart such as special promotions and related products. Such special promotions and related products may be automatically displayed by front-end POS software application 3 when a particular product is added to the shopping cart, if the particular product is otherwise displayed by front-end POS software application 3, or may be displayed in response to a request by the sales representative. At step 63, the sales representative can then build and organize the shopping cart for the customer. The sales representative can insert the number or quantity of products, the color of the products, the size of the products, and any discounts that might be applicable to the products. The sales representative can also add or remove products, and can view and edit the cart. After the shopping cart has been built and organized, the sales representative can proceed to the payment process at step 65.

Figure 7:
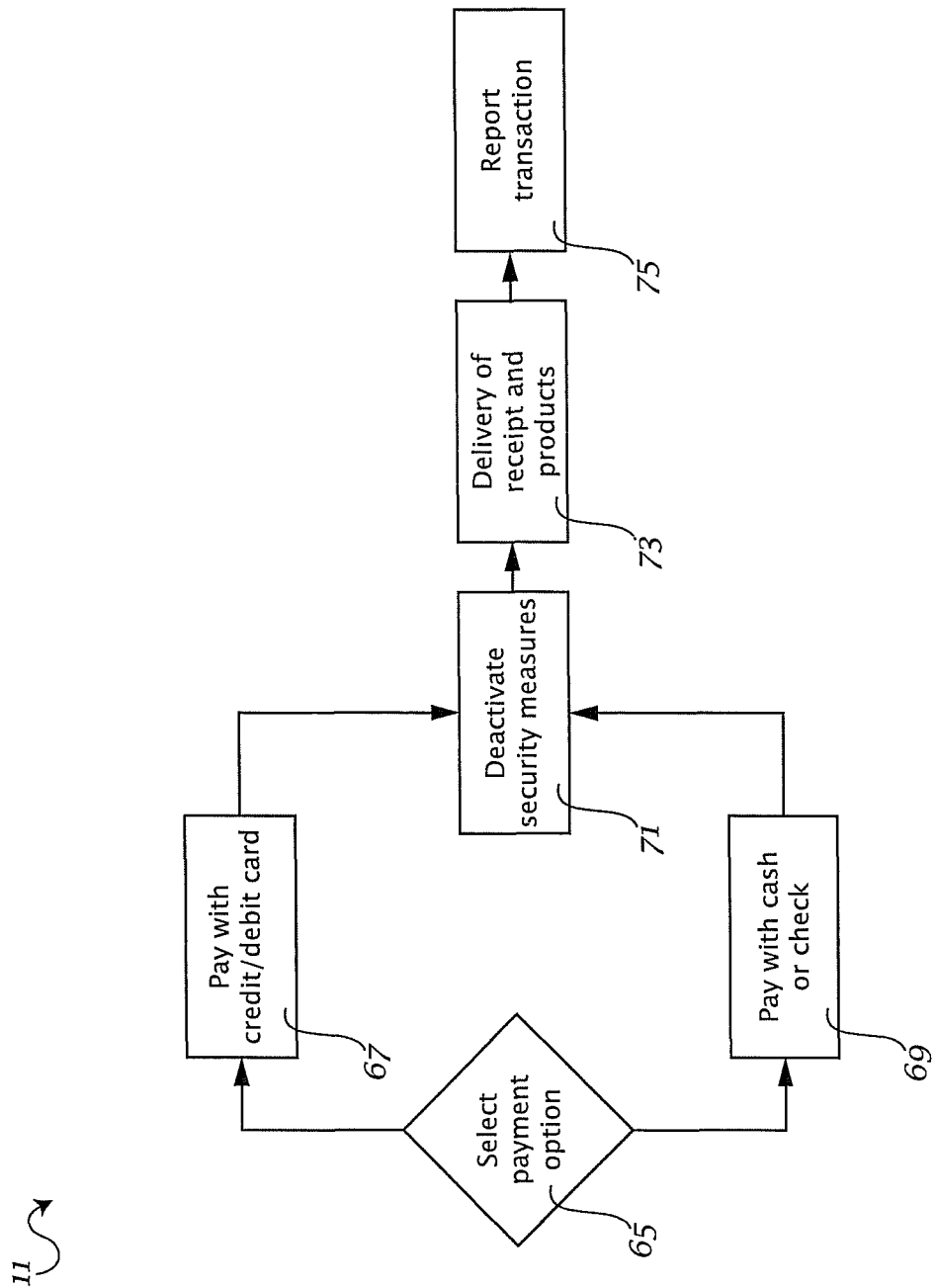
FIG. 7 shows the detailed functions of the transaction tendering step of FIG. 3.

FIG. 7 shows the detailed functions of step 11. At step 65, the sales representative can offer the customer a choice of at least two methods of payment. The first method of payment 67 may be to pay by credit or debit card, or by any other electronic funds transfer known in the art. If this option is chosen by the customer, the sales representative may choose the tender option on the interface of front-end POS software application 3 and may swipe the customer's card through card swiper 306 of holster 300, or may utilize smart card reader 308 to read information from a chip embedded in the card. The card information may then be communicated from holster 300 to front-end POS software application 3, whereupon front-end POS software application 3 may gather the card information and begin the authorization process by submitting the card information directly to a payment server. The payment server may forward the card information to the card provider and can either receive authorization to charge the card or receive a notice that the card has been rejected. The payment server may then forward the authorization or rejection notice to the front-end POS software application 3 where it can be accessed and viewed by the sales representative. If the card is authorized, the transaction can be completed; otherwise, the sales representative may request another payment method from the customer. The second method of payment 69 can be to pay by cash, check or other known physical funds exchange medium. If this option is chosen by the customer, the sales representative can receive the cash or check from the customer, may count and verify the amount, may choose the tender type on the front-end POS software application 3, put the cash or check into his daily till, and confirm the payment. Record of the completed transaction can then be sent to the central storage application 22. While step 65 is being completed by the sales representative, the representative can also perform step 71 and deactivate any RFID labels, magnetic anti-theft tags, or any other known security measures on the purchased products.

At step 73, the sales representative can print out a receipt of the sale and/or credit card receipt on a mobile printer that is communicatively coupled to holster 300, or can connect via a wireless protocol to a remote printer that is disposed within the store. Front-end POS software application 3 may also send a receipt to the customer's email account of record via the central storage server 22. Subsequently, the payment may be confirmed, the sale may be closed, and the products can be delivered to the customer. At step 75, the completed transaction can be reported to the central storage server 22. Real time inventory information and sales updates may also be reported to the central storage server 22 so as to keep the inventory and sales data that are stored in the central storage server 22 up to date.

Figure 8:
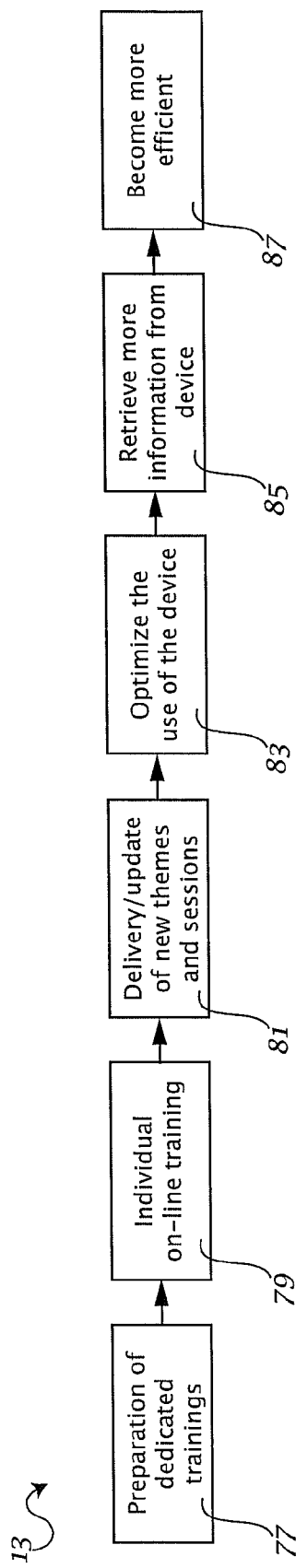
FIG. 8 shows the detailed functions of the training step of FIG. 3.

FIG. 8 shows the detailed functions of step 13, whereupon the sales representative or another member of a store's team may conduct training exercises so as to improve knowledge related to the store and the front-end application 3. At step 77, a manager of the store or another authorized individual can collect and analyze multiple choice question (MCQ) data and use the data to prepare and qualify dedicated training actions. Subsequently, at step 79, each sales representative can access these various training sessions (e.g. relating to product, brand name, etc.) to benchmark and increase his knowledge of the application. At step 81, the sales representative can quiz himself on his knowledge of specific products and can input new themes and sessions into the central storage application 22 using in-memory analytical application 24. The sales representative can also train himself specifically on the use of the front-end software application 3. At step 83, the sales representative may want to optimize his use of the front-end software application 3 and may want to navigate more quickly through the applications. At step 85, the sales representative can download a detailed user guide that is available on the device to learn more about how to use the device. At step 87, the sales representative, having taken e-learning programs and accessed the user guide, can become more efficient in the use of the device and can be able to perform all the operations more quickly and can be more confident in his use of the device.

Figure 9:
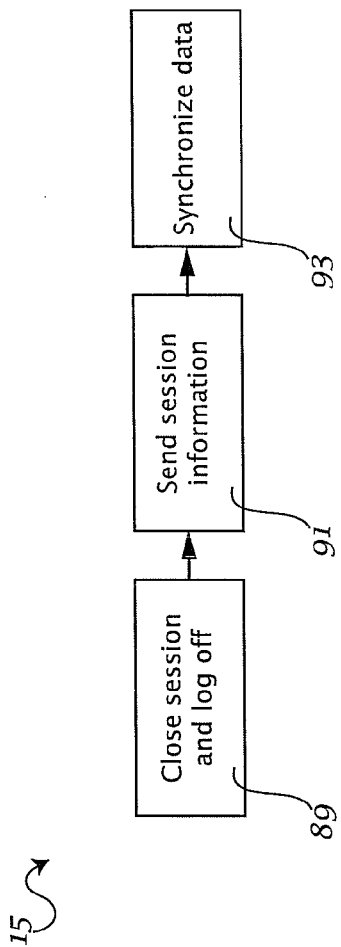
FIG. 9 shows the detailed functions of the log-out step of FIG. 3.

FIG. 9 shows the detailed functions of step 15, whereupon an open session on front-end application 3 may be closed. At step 89, the sales representative can access a menu on the front-end application 3 and close the session. At step 91, the session information can be sent from the front-end application 3 to the central storage application 22. At step 93, the session data can be uploaded into the central storage application 22 and synchronized between central storage application 22 and front-end application 3.

FIG. 10 shows the overall process 100 performed for inputting and managing data into the central storage application 22 using the in-memory analytic software application 24 according to the present invention. At step 102, the cash registers in the store may be checked and reconciled with the sales receipts and the results can be recorded in central storage application 22. At step 104, a master database can be created using the data input from the front-end software device 3 or from an external system. At step 106, the master database can be managed and maintained by a human user for more organized and efficient ongoing usage. This can include entering statements on sales and turnover, updating store information, updating tax rates, etc. Sales statements can include sales by store, sales performance for each department in a store, sales by product, sales by product by sales representative, sales by sales representative, or any other desired criteria. Turnover statements can include, as a non-limiting example, turnover by period, turnover by product, turnover by product by sales representative, turnover by sales representative, or any other desired criteria.

FIG. 11 shows the detailed functions of step 102. At step 108, the sales representative can signal to the central storage application 22 that the business day has ended. Consequently, central storage application 22 may communicate with mobile devices 201 so as to close all shopping sessions running via front-end applications 3. At step 110, the sales representative may send all the final session data from the front-end software application 3 to the central storage application 22. At step 112, the sales representative can examine the daily report and compare the statement amounts with the amount of the daily sales receipts. At step 113, the sales representative can make a bank deposit of all the funds from the daily sales transactions and log off the front-end software application 3. Subsequently, at step 114, the store manager can validate the sales representative's reconciliation, sign the representative's report slip, validate the real sales amount on the back-end software application 24, and issue and print a final report. At step 116, the central storage application 22 receives the updated sales report, generates stock and sales interfaces, and sends the data to the back-end applications 103. The stock interface can include, but is not limited to, such data as turnover by time period, turnover by product, turnover by product by sales representative, and turnover by sales representative. The sales interface can include, but is not limited to, such data as sales by store, sales performance for each department in the store, sales by product, sales by product by sales representative, and sales by sales representative. This data can be compiled, managed, and reported using in-memory analytic software application 24.

Figure 12:
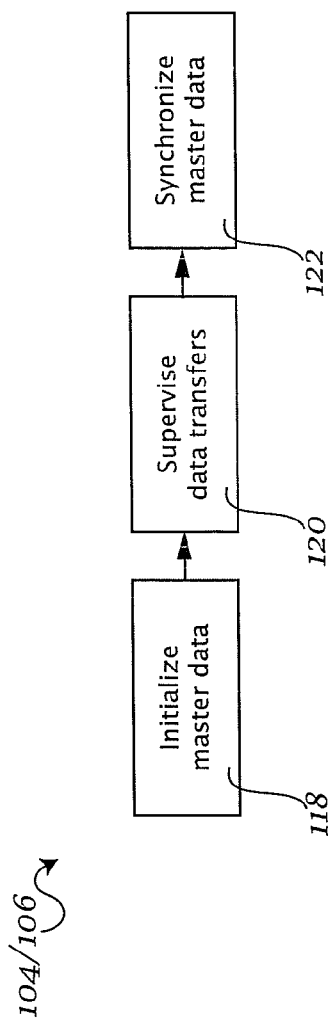
FIG. 12 shows all the detailed functions of the master data creation step of FIG. 10.

FIG. 12 shows the detailed functions of steps 104 and 106. At step 118, the master data can be initialized, at which the contextual required information for master data implementation may be given. At step 120, the data transfers and changes can be supervised. At step 122, the master data can be synchronized between the central storage application 22 and the front-end software application 3. All master data changes can be updated to the front-end software application 3 when a new session is started and synchronization is launched by the front-end application 3. Data repositories available in the central storage application 22 can include, but isn't limited to, information on customers, products, stores, users, sales, inventory, currencies, types of payment, taxes, and languages, or any other desired criteria.

The central storage application 22 can include, but is not limited to, the following main functions: catalogue, store, sales, inventory, customer, promotion, security roles, and configuration. Using the catalogue function, the administrator can place product categories into a hierarchical grouping and can create, modify and delete categories, and manage category details and product mappings. The administrator can also create, modify, or delete products, product variants, and product reviews. The administrator can also manage product attributes and specifications. The store, price, start/end dates, and the product variant attributes are assigned.

Using the store function, the administrator may create, modify, and delete stores and store details. The administrator can also choose multiple stores from any part of the store hierarchy and define them as a store group, which are used for data distributions. Store groups can be created, modified, and deleted as desired. The administrator can also manage employees in the database. Data such as employee name, role, personal information, language, store, and status can be defined and organized. The administrator can also add, modify, or delete terminal devices and terminal details used in conjunction with the front-end software application 3.

Using the sales function, the administrator can manage and track sales orders, capture payments, and process open orders using electronic customer signatures. The administrator can also view and print reports of sales that match specified criteria such as sales completed and pending. Using the inventory function, the administrator can monitor inventory and manage stock between stores. Using the customer function, the administrator can manage customer details such as contact information, address lists, status, and previous orders.

Using the promotion function, the administrator can use campaigns to easily send promotion emails to the registered customers to inform them of new offers. The administrator can also create discounts for certain items, set a time frame for the discounts to apply, generate coupon codes for customers, and restrict discounts to certain categories of customer. The administrator can also manage various external promotion providers and sitemap settings for search engines to distribute the promotional material. Using the security roles function, the administrator can define and modify security roles and may grant certain employees access to all or certain applications. The access points set for a role determine what functionality is available to the user.

Using the configuration function, the administrator can use global settings to manage general store settings, search engine optimization (SEO)/display settings, image settings, mail settings, and security settings. The administrator can use payment settings to manage the credit card types that are enabled in store and the payment providers available in store. The administrator can use tax settings to manage general tax information and organize tax providers to calculate tax on customer orders. The administrator can use location settings to manage the states/provinces of countries, the language, and the currencies that are available in store.

Figure 13:
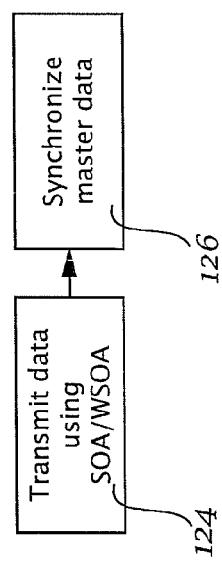
FIG. 13 shows all the detailed functions of the master data management step of FIG. 10.

FIG. 13 shows the detailed steps of retrieving data repositories from back-end systems, where the central storage application 22 can be synchronized with the back-end application 103. At step 124, data can be transmitted from the back-end application 103 to the central storage application 22 using service oriented architecture (SOA/WSOA). The master data can be replicated or updated in the central storage application 22 from the back-end application 103 using SOA. Some master data tables such as currencies/VAT can be replicated or updated from external sites using WSOA. At step 126, the master data can be synchronized between the central storage application 22 and the front-end software application 3. The repositories can be sent and updated into the central storage application 22 and then transmitted to the front-end software application 3. If the external systems or sites are not compatible with web services, an ETL integration middleware application such as E-Touch Point can be used. By using an E-Touch Point platform, the central storage application 22 synchronization can be done with customer relationship management (CRM), inventory management information applications, finances, HR, e-commerce, call center, and external websites. The platform can extract the data from the source application, translate the data to the correct format if necessary, and load the data to the target system. Central storage application 22 can be either the source or target system depending on the data and update cycle.

Figure 14A:
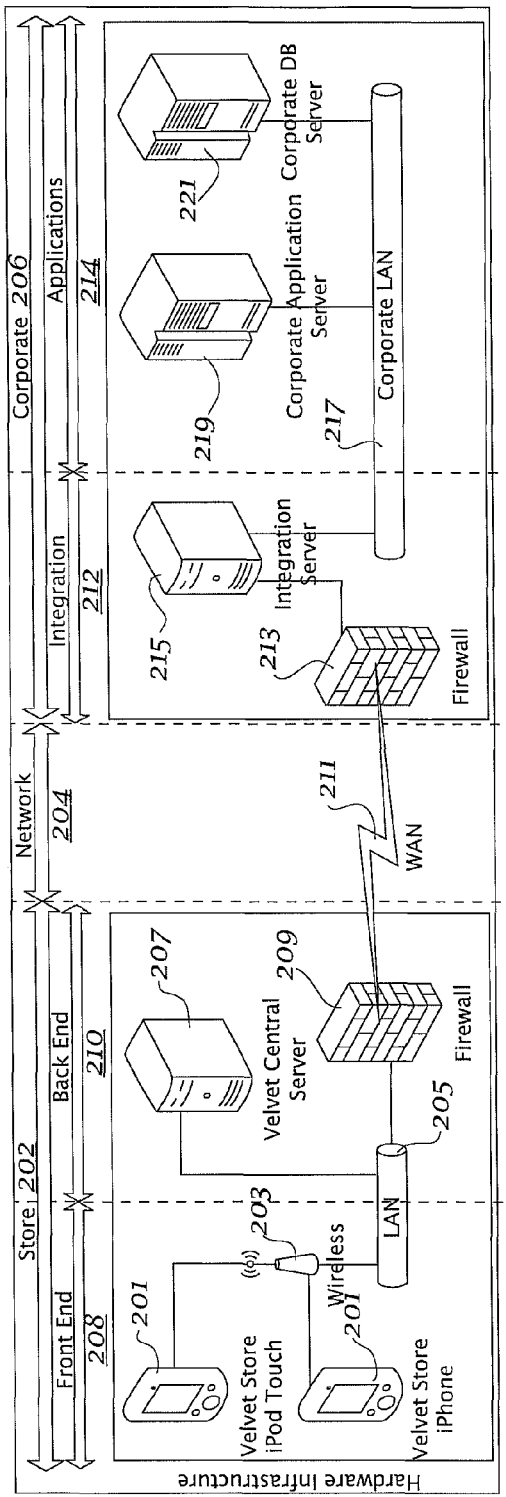
FIG. 14A shows the hardware infrastructure of the store, the network, and the corporate base.
Figure 14B:
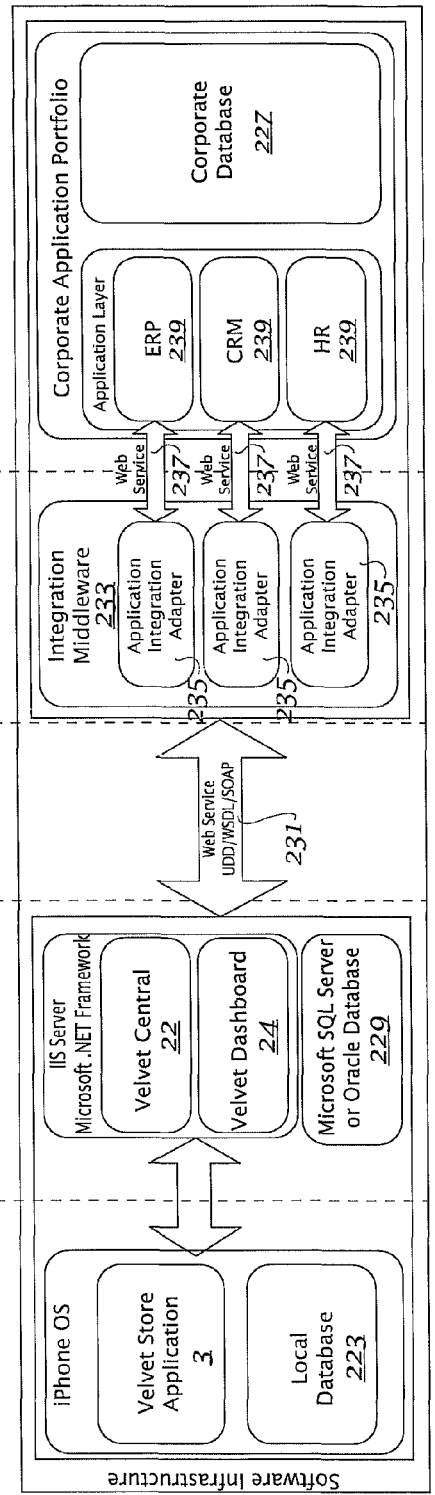
FIG. 14B shows the software infrastructure of the store, the network, and the corporate base.

FIGS. 14A-14B show hardware and software infrastructure respectively for an exemplary embodiment. FIG. 14A depicts the technical infrastructure inside the customer environment and performs the processes described above. In this embodiment, the customer can be the owner of the hardware. FIG. 14A shows three main sections of the hardware infrastructure: the store 202, the network 204, and the corporate base 206. The store 202 further can have a front-end 208 and a back-end 210. The corporate base 206 further can have an integration stage 212 and an application stage 214. The store front-end 208 can include a mobile device or devices 201 that implement the front-end software application 3. The mobile device 201 can connect via a wireless protocol 203 to a LAN 205 that services the store 202. The store back-end 210 can include a central storage server 207 and a firewall 209. The firewall 209 can prevent any unwanted communication in and out of the LAN 205. The network 204 can include a WAN 211 or other widespread network by which the store 202 transmits data to and from the corporate base 206. The corporate base integration stage 212 can have a firewall 213 and an integration server 215. The firewall 213 can prevent any unwanted communication in and out of the corporate networks. The integration server 215 can manage and organize the incoming data from the store 202 and the outgoing data from the application stage 214 of the corporate base 206. Integration server 215 can receive and transmit data to and from the application stage 214 through a corporate LAN 217. The application stage 214 can include a corporate application server 219 and a corporate database server 221.

FIG. 14B shows the software infrastructure of the store 202, network 204, and corporate base 206. The mobile device 201 can implement the front-end software application 3 and contain a local database 223. The LAN 205 can be implemented with an XML/HTTP web service 225. The central storage server 207 can implement central storage software 22 and back-end software 24 as well as use a Microsoft SQL server 229. The network 204 can implement a web service 231 such as UDD/WSDL/SOAP. The integration server 215 can implement integration middleware 233, which can include multiple application implementation adapters 235. The corporate LAN 217 can be implemented by a similar web service 237 as the LAN 205. The corporate application server 219 can interface with the integration server 215 and have a connection over the corporate LAN 217 to an application integration adapter 235 for each corporate application 239. The corporate database server 221 can implement any industry recognized database 227.

Figure 15A:
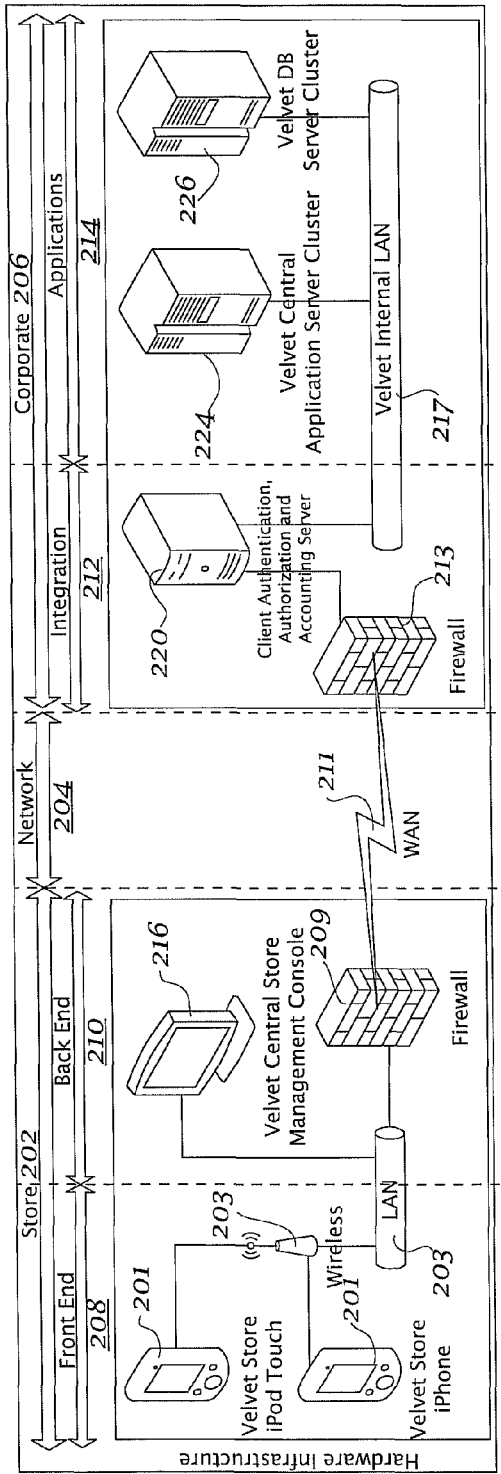
FIG. 15A shows the hardware infrastructure of the store, the network, and the corporate base using an application service provider.
Figure 15B:
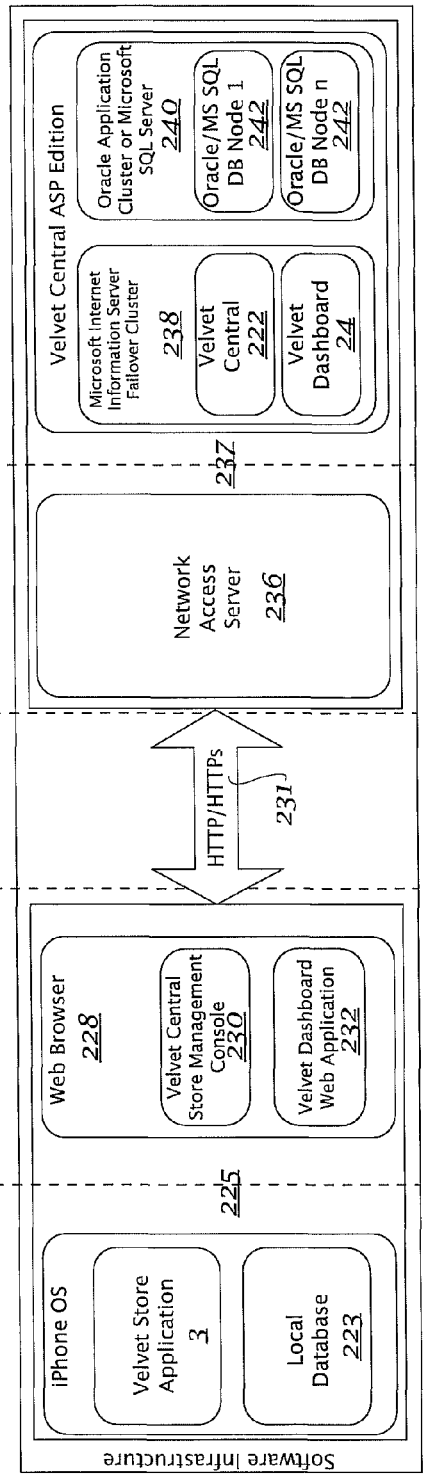
FIG. 15B shows the software infrastructure of the store, the network, and the corporate base using an application service provider.

FIGS. 15A-15B show hardware and software infrastructure respectively for an exemplary embodiment using an application service provider. FIG. 15A is the technical infrastructure when there is an application service provider (ASP) or software as a service (SAAS) implementation model. FIG. 15A shows the store 202, the network 204, and the corporate base 206. Store 202 further can have a front-end 208 and a back-end 210. The corporate base 206 further can have an authentication stage 216 and an application stage 214. The store front-end 208 can contain a mobile device or devices 201 that can implement the front-end software application 3. The mobile device 201 can connect via a wireless protocol 203 to a LAN 205 that services the store 202. The store back end 210 can contain a central store management console 216 and a firewall 209. The firewall 209 can prevent any unwanted communication in and out of the LAN 205. The network 204 can include a WAN 211 or other widespread network by which the store 202 transmits data to and from the corporate base 206. The corporate base authentication stage 216 can have a firewall 213 and a client authentication server 220. The firewall 213 can prevent any unwanted communication in or out of the corporate networks. The authentication server 216 can analyze incoming consumer data from the store 202, authenticate and authorize transactions initialized from store 202, and keep accounting records for sales made at store 202. Authentication server 216 can also transmit application data from application stage 214 back to store 202. Authentication server 216 can receive and transmit data to and from the application stage 214 through a LAN 217. The application stage 214 can have an application server cluster 224 and a database servers cluster 226. The central storage application 22 environment can be shared between multiple customers and can implement all the processes discussed above.

FIG. 15B shows the software infrastructure of the store 202, network 204, and corporate base 206. The mobile device 201 can implement the front-end software application 3 and contain a local database 223. The LAN 205 can be implemented with an XML/HTTP web service 225. The central store management console 211 can run a web browser 228 that implements central store management software 230 and back-end web application 232. The network 204 can implement a web protocol 234 such as HTTP or HTTPs. The authentication server 216 can act as a network access server 236. The LAN 217 can be implemented by a similar web service 237 as the LAN 205. The application server cluster 224 can act as an information server failover cluster 238 that implements central server software 22 and back-end software application 24. The database servers cluster 226 can implement an Oracle database application cluster 240 with multiple database nodes 242.

Figure 16:
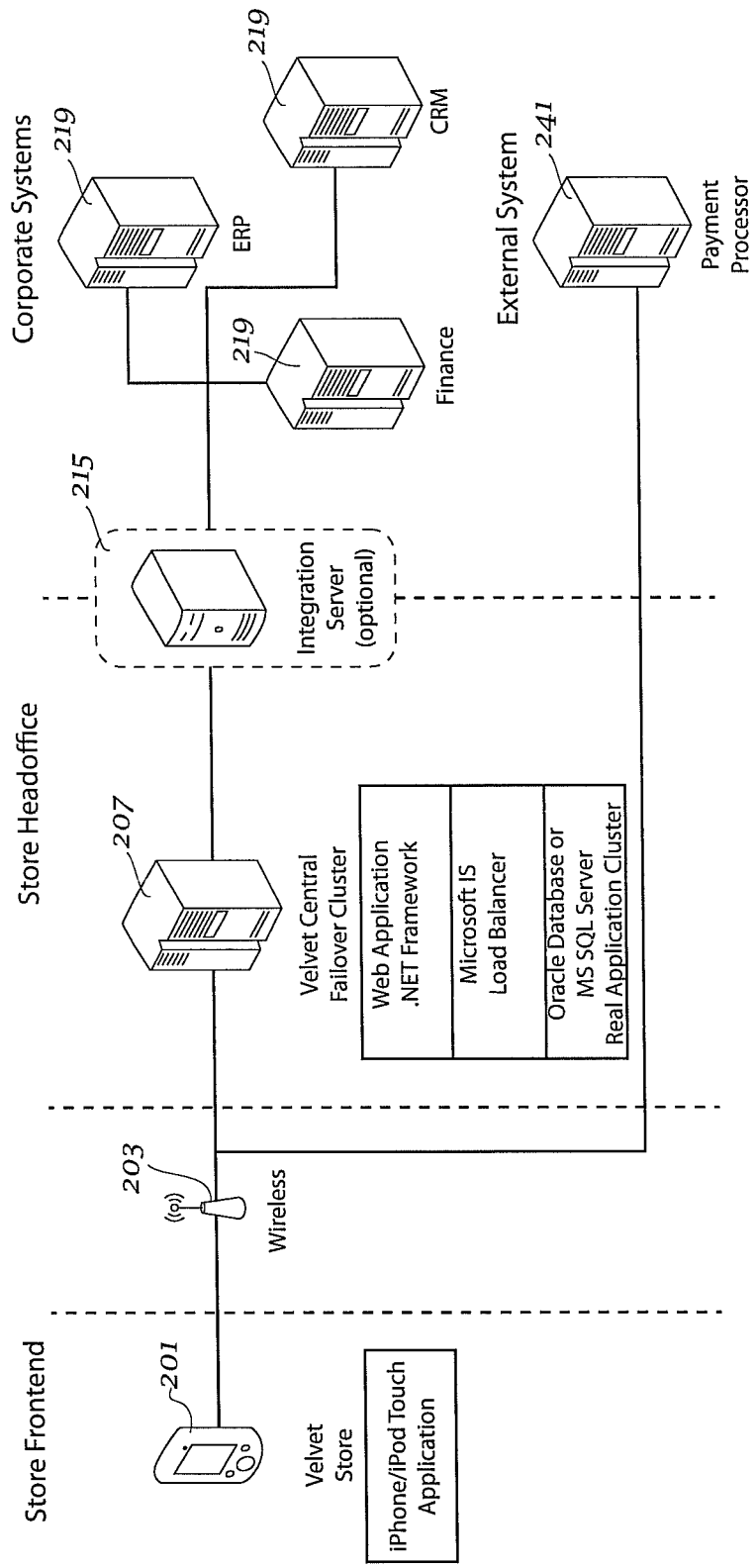
FIG. 16 shows a centralized hardware infrastructure for the present invention.

FIG. 16 shows an exemplary embodiment utilizing a centralized hardware layout architecture. In this embodiment, mobile devices 201 can communicate directly with the central storage server 207 via wireless protocol 203. Central storage server 207 can connect to application servers 219 and an external payment processor 241. Integration server 215 can be connected between central storage server 207 and application servers 219. Several stores containing multiple customer mobile devices can each be connected to the central storage server 207. Mobile devices 201 may also communicate directly with payment processor 241 via a wireless protocol 203. Wireless protocol 203 may be an 802.11 compatible wireless protocol, a wireless protocol such as 3G, 4G, GPRS, or EDGE, or any other wireless communications protocol. Such a layout may require less hardware and fewer connection steps than other possible layouts.

Figure 17:
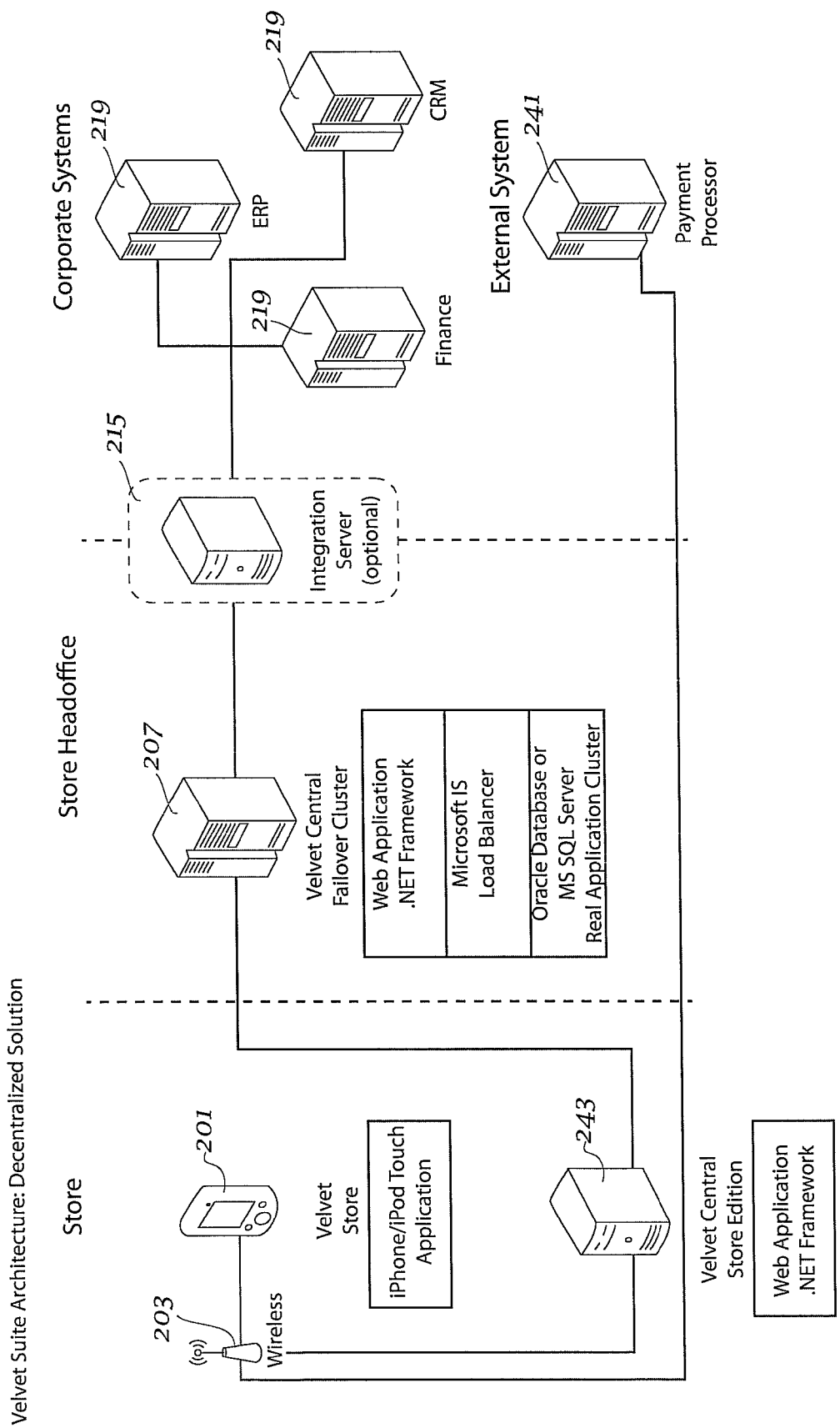
FIG. 17 shows a decentralized hardware infrastructure for the present invention.

FIG. 17 shows an exemplary embodiment utilizing a decentralized hardware layout architecture. In this embodiment, mobile device 201 can communicate with a store storage server 243 via wireless protocol 203. Each store can have a separate store storage server 243. Each store storage server 243 can then connect to both central storage server 207 and payment processor 241. Central storage server 207 can connect to application servers 219. Integration server 215 can be connected between central storage server 207 and application servers 219. Mobile devices 201 may also communicate directly with payment processor 241 via a wireless protocol 203. Wireless protocol 203 may be an 802.11 compatible wireless protocol, a wireless protocol such as 3G, 4G, GPRS, or EDGE, or any other wireless communications protocol. Such a layout may allow each store to function as a separate system having its own server 243. Additionally, if the central server 207 goes offline, the functionality of individual store systems is retained.

Figure 18:
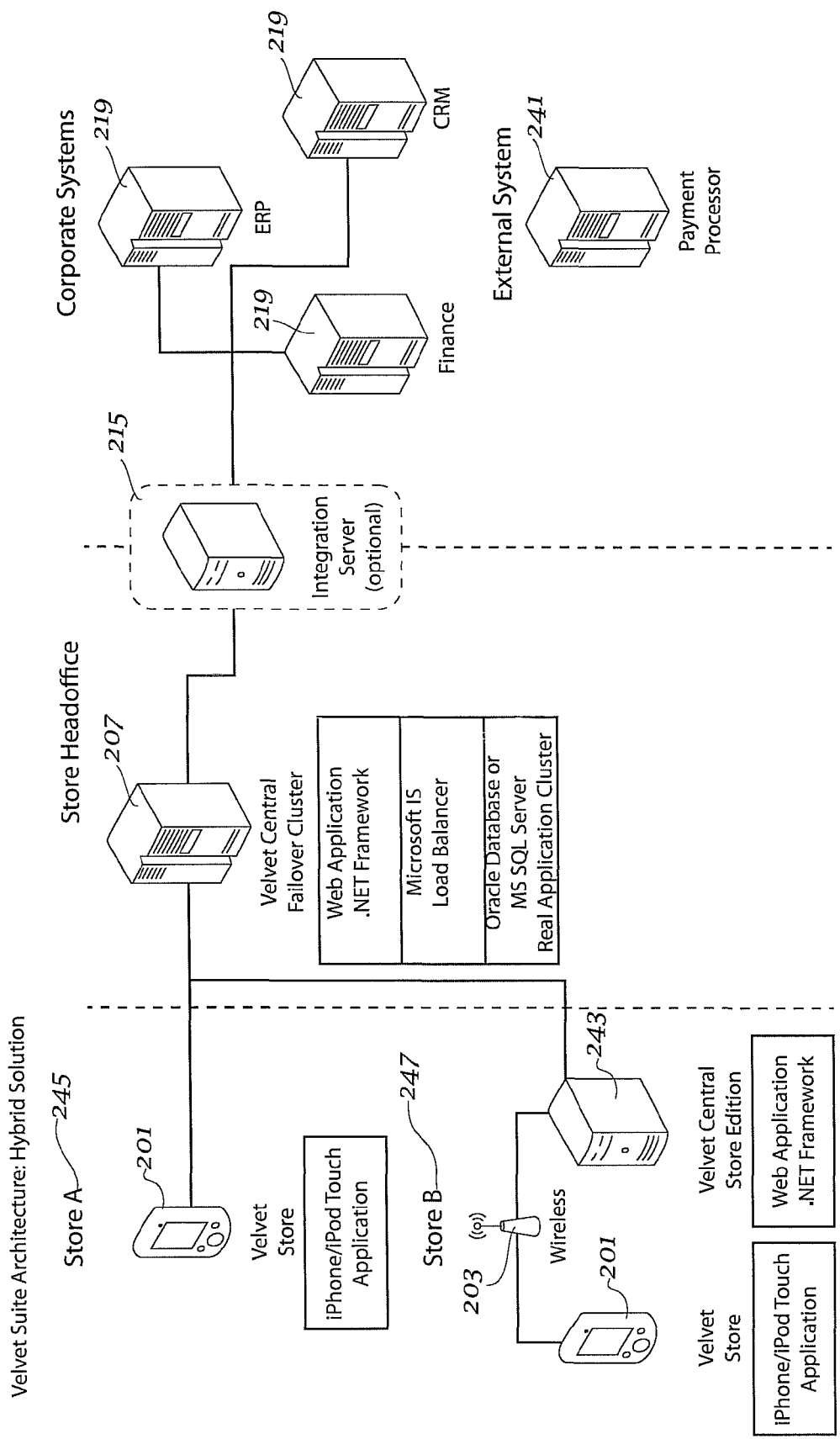
FIG. 18 shows a hybrid hardware infrastructure for the present invention.

FIG. 18 shows an exemplary embodiment utilizing a hybrid hardware layout architecture. Such an architecture may allow each store to decide which architecture the store would like to implement. For example, first store 245 can implement the centralized hardware layout architecture of FIG. 16, while second store 247 can implement the decentralized hardware layout architecture of FIG. 17. Thus, a versatile and resilient hardware layout architecture may be achieved.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for conducting commerce and sales operations comprising:
   at least one mobile device, removably and communicatively coupled to a mobile holster, the at least one mobile device implementing a front-end point-of-sale software application;
   a central server, coupled to the at least one mobile device via a first LAN, the central server implementing a central software application and an in-memory business analytic software application;
   an application server coupled to a database server via a second LAN, wherein the second LAN is communicatively coupled to the first LAN;
   a payment processor communicatively coupled between the first LAN and the second LAN;
   the mobile holster further comprising:
      a docking station adapted to communicatively couple to the mobile device;
      a sliding cradle adapted to secure the mobile device and communicatively couple the mobile device to a communications connector;
   wherein during an in-store retail transaction, the central software application synchronizes with the front-end-point-of-sale software application at the at least one mobile device to determine a customer's information entered into the at least one mobile device and confirm the existence of the customer in the central server software, and upon confirmation of an existing customer's identity, the existing customer's personal data including customer usage data is sent from the central software application to the front end point-of-sale software application;
   wherein at least one product is selected at the at least one mobile device by utilizing the existing customer usage data, payment information is entered into the at least one mobile device and communicated from the mobile holster to the front-end point-of-sale software application, whereupon the payment information is submitted to the payment server for authorization.

2. The system of claim 1, further comprising an integration server communicatively coupled to the first LAN.

3. The system of claim 1, wherein the second LAN is communicatively coupled to the first LAN via an integration server.

4. The system of claim 1, wherein the at least one mobile device is communicatively coupled to the payment processor via a wireless protocol.

5. The system of claim 1, wherein the mobile holster further comprises:
- a magnetic card swiper;
- a smart card reader;
- an infrared bar code reader;
- a keypad;
- a wireless communication device; and
- a cover.

* * * * *